United States Patent [19]

Stewart

[11] Patent Number: 5,610,983
[45] Date of Patent: Mar. 11, 1997

[54] APPARATUS FOR DETECTING A SYNCHRONIZATION COMPONENT IN A SATELLITE TRANSMISSION SYSTEM RECEIVER

[75] Inventor: John S. Stewart, Indianapolis, Ind.

[73] Assignee: Thomson Consumer Electronics, Inc., Indianapolis, Ind.

[21] Appl. No.: 315,516

[22] Filed: Sep. 30, 1994

[51] Int. Cl.[6] .......................... H04L 9/00; H03M 13/00; H04N 7/12
[52] U.S. Cl. .......................... 380/48; 348/420; 371/42; 375/262; 375/357
[58] Field of Search ....................... 380/15, 48; 371/37.5, 371/42; 348/420, 421, 500; 375/262, 357

[56] References Cited

U.S. PATENT DOCUMENTS

| 4,614,970 | 9/1986 | Clupper et al. |  |
|---|---|---|---|
| 4,815,129 | 3/1989 | Griffen et al. | 380/15 |
| 5,117,427 | 5/1992 | Miyake et al. | 371/37.4 |

OTHER PUBLICATIONS

*On Frame Synchronization of PCM Systems*, Denis T. R. Munhoz, Jose Roberto B. DeMarca and Dalton S. Arantes Members IEEE, IEEE Transactions on Consumer Electronics, vol. COM–28, No. 8, Aug. 1980.

*Draft Specification of Modulation, Channel Coding and Framing Structure for the Baseline System for Digital Multi-Programme Television by Cable,* Contribution from DTVC, European Broadcasting Union, DTVC 38, 5 pgs., Dec. 1993.

*Digital Communication,* Lee and Messerschmitt (Kluwer Academic Press, Copyright 1988, Fifth printing 1992), pp. 439–445.

*Primary Examiner*—Stephen C. Buczinski
*Attorney, Agent, or Firm*—Joseph S. Tripoli; Eric P. Herrmann; Ronald H. Kurdyla

[57] ABSTRACT

A satellite transmission system receiver, for receiving a composite signal including a data component and a synchronization (sync) component is disclosed. The receiver includes a signal processor, responsive to the received data component, and requiring a periodic sync signal in synchronism, with the sync component. A sync signal generator periodically produces the sync signal. A sync component detector, responsive to the sync component, synchronizes the sync signal generator to the received sync component. The satellite transmission system receiver further includes a sync word predictor, responsive to the received data signal, for predicting the locations of sync words in the received data signal and a sync word inserter, coupled to the sync word predictor, for substituting a word having the value of the sync word into the received data signal at a predicted location.

8 Claims, 1 Drawing Sheet

APPARATUS FOR DETECTING A SYNCHRONIZATION COMPONENT IN A SATELLITE TRANSMISSION SYSTEM RECEIVER

FIELD OF THE INVENTION

The present invention relates to apparatus for detecting a synchronization component in a received composite signal in a satellite transmission system for the purpose of synchronizing the processing of the received signal.

BACKGROUND OF THE INVENTION

In present satellite transmission systems, data transmitted through the satellite link is partitioned into blocks. The partitioned data is (among other things) scrambled to produce an output signal having a relatively flat spectrum, thus optimizing the use of the bandwidth. Synchronization (sync) words, which may have one of two values (described in more detail below), are then added to the beginning of each block, and the resulting stream of data words is Reed-Solomon encoded to permit detection and correction of data words corrupted by noise during the transmission process. Circuits in the receiver recognize and process the sync word in each block to synchronize the receiver circuitry to the blocks in the received signal. Then the data in each block is (among other things) Reed-Solomon decoded and descrambled to extract the transmitted data.

The descrambling circuitry in the receiver operates by exclusive-ORing a descrambling sequence with the received scrambled data to produce unscrambled data for subsequent processing. In order to operate properly, the descrambling sequence must periodically be reset. In an embodiment currently in use in European satellite digital TV systems, the descrambling sequence must be reset every eight blocks. A sync word having a first value is normally included at the beginning of each block, but an inverted sync word (i.e. one having a value which is the logical inverse of the value of the normal sync word) is included at the beginning of every eighth block to indicate that the descrambling sequence must be reset. Current receiver circuitry detects the inverted sync word at the beginning of a block and resets the descrambling sequence.

A problem with such a system occurs when an inverted sync word and other data in its associated block become so corrupted that the Reed-Solomon decoder cannot correct it. In this case, no inverted sync word is detected by the receiver circuitry, and the descrambler is not reset. Consequently, all following blocks until the next successful reception of an inverted sync word are incorrectly descrambled, even though they may have been properly corrected by the Reed Solomon decoder. The descrambling sequence cannot be reset until some integer multiple of eight blocks have passed, i.e. at least eight blocks.

SUMMARY OF THE INVENTION

The inventor has realized that by employing a flywheel sync detection circuit, blocks which contain an inverted sync word may be properly predicted, and the descrambling sequence reset, even if the inverted sync word and its block become so corrupted that the Reed-Solomon decoder is not able to correct it.

A Reed-Solomon decoder is capable of correcting only a predetermined maximum number of corrupted data words within a block of data words. If more than that maximum number of data words are corrupted, the block cannot be corrected. The inventor has further realized that apparatus that can properly predict which blocks contain an inverted sync word (and consequently which blocks contain a non-inverted sync word) can insert a correct sync word (inverted or non-inverted) into the data stream at the beginning of each block. Because the Reed Solomon decoder is receiving correct sync words for each block, it is possible to properly correct one extra corrupted data word in the remainder of the block.

In accordance with principles of the present invention, a satellite transmission system receiver, receives a composite signal including a data component and a synchronization component. The receiver includes a signal processor, responsive to the received data component, and requiring a periodic synchronization signal in synchronism with the synchronization component. A synchronization signal generator periodically produces the synchronization signal. A synchronization component detector, responsive to the synchronization component, synchronizes the synchronization signal generator to the received synchronization component.

In accordance with another aspect of the invention, a satellite transmission system receiver includes a synchronization word predictor, responsive to the received data signal, for predicting the locations of synchronization words in the received data signal and a synchronization word inserter, coupled to the synchronization word predictor, for substituting a word having the value of the synchronization word into the received data signal at a predicted location.

DETAILED DESCRIPTION OF THE DRAWINGS

Figure 1:
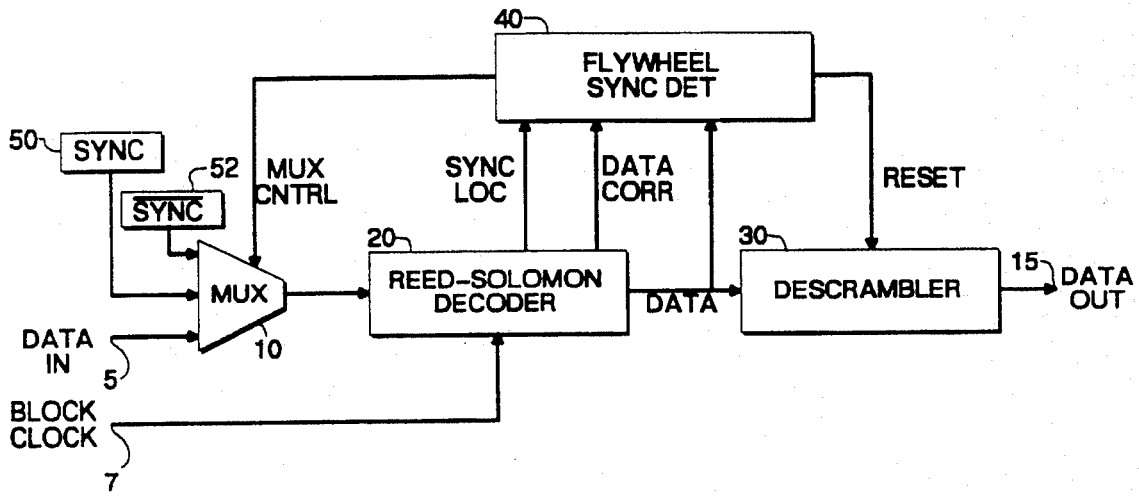
FIG. 1 is a block diagram of a portion of a satellite digital signal receiver incorporating the present invention.

FIG. 1 is a block diagram of a portion of a satellite digital signal receiver incorporating the present invention. The satellite receiver may be associated with a television receiver for processing television signal data including video and sound information, for example, as well as other types of data and data processors. In FIG. 1 the front end of a satellite digital signal receiver (not shown) is coupled to a data input terminal 5 and a block clock input terminal 7. The front end of the receiver may include the serial connection of a tuner, digital demodulator, Viterbi decoder and deinterleaver, all arranged in a known manner and controlled by an associated microcontroller in response to user input. The data input terminal 5 is coupled to a serial connection of a multiplexer 10, a Reed-Solomon decoder 20 and a descrambler 30; and the block clock input terminal 7 is coupled to a clock input terminal of the Reed-Solomon decoder 20. An output terminal of descrambler 30 is coupled to a data output terminal 15. The data output terminal 15 is coupled to data utilization circuitry (not shown) for processing the received data signal. The data utilization circuitry may include a plurality of data signal processors, such as video and audio signal processors; and a transport processor for distributing appropriate portions of the received data signal to the respective data signal processors, all also arranged in known manner and controlled by the microcontroller.

A flywheel sync word detector 40 has respective input terminals coupled to data, data correct, and sync word located output terminals of the Reed-Solomon decoder 20. The flywheel sync word detector 40 has respective output terminals coupled to a control input terminal of the multiplexer 10 and to a reset input terminal of the descrambler 30. Registers 50 and 52 hold the values of the sync word, and inverted sync word, respectively, and are coupled to second and third data input terminals of the multiplexer 10.

The portion of the receiver illustrated in FIG. 1 performs error detection and correction and descrambling operations upon a received data signal. The front end of the receiver (not shown) operates in a known manner to produce the received data signal at the data input terminal 5, and a block clock signal, synchronized with the received blocks, at the block clock input terminal 7. In general, the multiplexer 10 is conditioned to connect the data input terminal 5 to the Reed-Solomon decoder 20. The ReedSolomon decoder 20 analyzes the data block, including the sync word, data words and Reed-Solomon parity bits, detects errors in the block, and, to the extent possible, corrects corrupted data words, all in a known manner. If the block was successfully decoded, and therefore contains no errors, an indicative signal is produced at the data correct output terminal. This decoded data is then descrambled by descrambler 30.

The Reed-Solomon decoder 20 utilizes the block clock signal for locating sync words. Whenever a sync word is present at the data output terminal of the Reed-Solomon decoder 20, an indicative signal is produced at the sync word located output terminal. The flywheel sync word detector 40 monitors the sync word located, data correct, and data output signals from the Reed-Solomon decoder 20. Whenever the sync word located signal indicates that a sync word is present at the data output terminal of the Reed-Solomon decoder 20, and the data correct signal indicates that the output data is correct, that data is examined. If the data is an inverted sync word, a three-bit counter in the flywheel sync word detector 40 is set to '0'. In response to the counter having the value '0', the flywheel sync word detector 40 sends a reset signal to the descrambler 30 to reset the descrambling sequence, as described above. If the output data is a noninverted sync word, or if the data is not correct, then the three-bit counter is incremented in response to the sync word located signal.

Because a three-bit counter recycles at the repetition rate of the inverted sync signal, e.g. in the illustrated embodiment every eight counts, the counter will have a '0' value every eight blocks and the descrambler 30 will accordingly be reset every eight blocks, regardless of whether an inverted sync word is accurately decoded by the Reed-Solomon decoder 20. This enables the receiver to properly process subsequent blocks even if the inverted sync word (and its block) is corrupted and not correctable by the Reed-Solomon decoder 20.

Because it is possible to predict which blocks contain non-inverted sync words and which contain inverted sync words, it is possible to replace (possibly corrupted) received sync words at the input of the Reed-Solomon decoder 20 with appropriate correct sync words. When the three-bit counter in the flywheel sync detector has the value '0', then the multiplexer 10 is conditioned to connect the register 52, containing the inverted sync word, to the input of the Reed-Solomon decoder 20 at the appropriate sync word time. When the three-bit counter has a non-zero value, then the multiplexer 10 is conditioned to connect the register 50, containing the non-inverted sync word, to the input of the Reed-Solomon decoder 20 at the appropriate sync word time. By substituting correct sync words from registers 50 or 52 for possibly corrupt received sync words, an extra data word in the data portion of the block may be corrected. For example, if the Reed-Solomon code being used can correct up to ten corrupted words in a block and the sync word is corrupted, then no more than nine other data words may be corrupted for the block to be corrected. If a correct sync word is always supplied from registers 50 or 52, then up to ten data words may be corrupted and still be corrected, even if the received sync word was also corrupted. This results in a slight performance improvement for the Reed-Solomon decoder 20.

It is possible that the flywheel sync word detector 40 may either start out-of-sync, or fall out-of-sync, with respect to the eight block inverted sync word sequence. In such a case, a non-inverted sync word may be incorrectly inserted into an inverted sync word block. However, it is likely that, at some point in the operation of the receiver, an inverted sync word block will be received which has few enough errors that the incorrectly inserted non-inverted sync word will be treated as a corrupted data word and corrected into an inverted sync word by the Reed-Solomon decoder 20. In such a case, the data correct and sync word located signals will indicate that a correct sync word is in the output data, and the output data will contain the newly corrected inverted sync word. In response, the flywheel sync word detector 40 will correctly resynchronize itself and the descrambler 30 will be properly reset.

Figure 2:
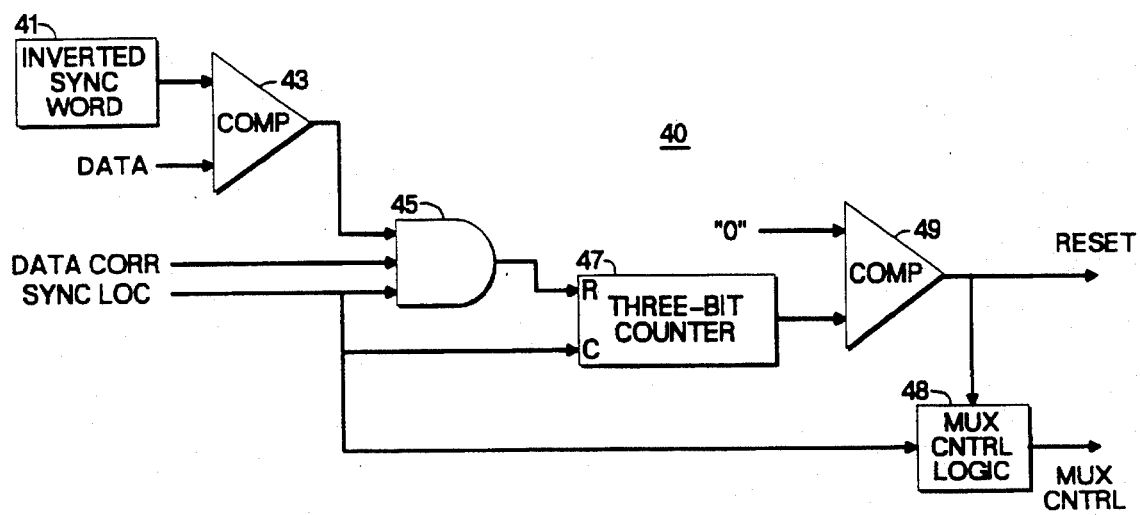
FIG. 2 is a block diagram of a flywheel sync word detector which may be used in the portion of the satellite digital signal receiver illustrated in FIG. 1.

FIG. 2 is a block diagram of a flywheel sync word detector 40 which may be used in the portion of the satellite digital signal receiver illustrated in FIG. 1. In FIG. 2, only elements necessary to understand the operation of the flywheel sync word detector 40 are illustrated. Other elements, such as logic glue elements, clock/timing elements, latching elements and/or delay elements, are not shown. One skilled in the art of logic design will understand what other elements may be required and how to include these elements in the flywheel sync word detector 40. In FIG. 2, the data, data correct and sync word located output terminals of the Reed-Solomon decoder (of FIG. 1) are coupled to corresponding input terminals of the flywheel sync word detector 40. The data input terminal is coupled to a first input terminal of a first comparator 43. A register 41, containing the value of the inverted sync word, is coupled to a second input terminal of the first comparator 43. An output terminal of the first comparator 43, and the data correct and sync word located input terminals, are coupled to respective input terminals of a three input AND gate 45. An output terminal of the AND gate 45 is coupled to a reset input terminal (R) of a three bit counter 47. The sync word located input terminal is also coupled to a count input terminal (C) of the three bit counter 47. An output terminal of the three bit counter 47 is coupled to a first input terminal of a second comparator 49. A second input terminal of the second comparator 49 receives a three bit '0' valued signal. An output terminal of the second comparator 49 is coupled to a reset output terminal of the flywheel sync word detector 40. The reset output terminal is coupled to the corresponding reset input terminal of the descrambler 30 (of FIG. 1). The output terminal of the second comparator 49 and the sync word located input terminal are coupled to respective input terminals of a multiplexer control logic circuit 48. An output terminal of the multiplexer control logic circuit 48 is coupled to a multiplexer control output terminal of the flywheel sync word detector 40, which, in turn, is coupled to the control input terminal of the multiplexer 10 (of FIG. 1).

In the following description, the circuit illustrated in FIG. 2 is assumed to be using positive active logic. In operation, the first comparator 43 monitors the data at the output terminal of the Reed-Solomon decoder 20 (of FIG. 1) for any occurrences of data words having the value of the inverted sync word. When such a data word is detected, the first comparator 43 produces an output signal having a logic '1' value. When such a data word has been detected, and a logic '1' signal is present at the sync word located input terminal, indicating that the data word is a sync word, and a logic '1' signal is present at the data correct input terminal, indicating that the data has been properly corrected by the Reed-Solomon decoder 20 (i.e. when a properly corrected inverted sync word is at the output of the Reed-Solomon decoder 20) then the AND gate 45 produces a logic '1' output signal. This causes the three bit counter 47 to be reset to a '0' value. The second comparator 49 produces an output signal having a logic '1' value whenever the output of the three bit counter 47 is a '0' valued signal. When this reset signal has a '1' value, the descrambling sequence in the descrambler 30 (of FIG. 1) is reset.

Whenever a logic '1' signal is present at the sync word located input terminal, indicating that a sync word is present at the output of the Reed-Solomon decoder 20 (of FIG. 1), then, the three bit counter 47 is incremented, unless it is being reset, as described above. The three bit counter 47 recycles to a three bit '0' valued signal every eight blocks, regardless of whether a properly corrected inverted sync word is detected. Thus, the descrambling sequence in the descrambler 20 (of FIG. 1) will be properly reset, and the descrambler 20 will continue to descrambler subsequent corrected data blocks, even if an inverted sync word is missed.

The multiplexer control logic circuit 48 may be a combinatorial logic circuit which takes as input the reset signal from the second comparator 49, and the sync word located signal from the Reed-Solomon decoder 20 (of FIG. 1) and produces signals for controlling the multiplexer 10 (of FIG. 1). Normally, the multiplexer control signal configures the multiplexer 10 to connect the data input terminal 5 to the input terminal of the Reed-Solomon decoder 20 (as described above). Only if a logic '1' signal is present at the sync word located input terminal, indicating a sync word, is the multiplexer reconfigured. If the sync word is an inverted sync word, as indicated by a logic '1' signal at the output terminal of the second comparator 49, then the multiplexer 20 is configured to connect the inverted sync word register 52 (of FIG. 1) to the Reed-Solomon decoder 20. If the sync word is a noninverted sync word, as indicated by a logic '0' signal at the reset output terminal of the second comparator 49, then the multiplexer 20 is configured to connect the inverted sync word register 52 (of FIG. 1) to the ReedSolomon decoder 20.

What is claimed is:

1. A satellite transmission system receiver, for receiving a composite signal including a data component and a synchronization (sync) component including successive words in the composite signal having a predetermined value, the receiver comprising:

a signal processor, responsive to the received data component, and requiring a periodic sync signal in synchronism with the sync component;

a source of a clock signal in synchronism with the sync component and aligned in time with the words in the sync component;

a sync signal generator for producing the periodic sync signal, comprising:

a counter, having a reset signal input terminal coupled to a sync component detector, a clock input terminal responsive to the clock signal, and a count signal output terminal, wherein the counter recycles at the repetition rate of the sync signal; and a comparator, coupled to the count signal output terminal, for generating the sync signal when the count signal equals a predetermined value; and the sync component detector, responsive to the sync component, for synchronizing the sync signal generator to the received sync component comprising:

an error detection and correction decoder, responsive to the composite signal, having a data output terminal and a data correct output terminal producing a signal indicating that data at the data output terminal is corrected data;

a comparator, coupled to the data output terminal of the error detection and correction decoder, having an output terminal producing a signal indicating that the word at the data output terminal of the error detection and correction decoder has the predetermined sync word value; and a logic gate having a first input terminal coupled to the data correct output terminal of the error detection and correction decoder, a second input terminal coupled to the output terminal of the comparator, a third input terminal responsive to the clock signal and an output terminal coupled to the reset input terminal of the counter.

2. A satellite transmission system receiver, for receiving a composite signal containing a data component, a first synchronization (sync) component, and a second sync component in synchronism with the first sync component, comprising:

a source of a clock signal in synchronism with the first sync component;

a signal processor requiring a periodic synchronization signal in sync with the second sync component;

a sync signal generator, responsive to the clock signal, for producing the sync signal in synchronism with the first sync component; and a second sync component detector for synchronizing the sync signal generator to the second sync component.

3. The receiver of claim 2, wherein the sync signal generator comprises:

a counter, having a reset signal input terminal responsive to the second sync component detector, a clock input terminal responsive to the clock signal, and a count signal output terminal, wherein the counter recycles at the repetition rate of the sync signal; and a comparator, coupled to the count signal output terminal, for generating the sync signal when the count signal equals '0'.

4. The receiver of claim 3 wherein:

the first sync component comprises successive words in the composite signal having one of a first and a second predetermined value wherein a predetermined number of sync words having the second predetermined value occur between each of the sync words having the first value, and the second sync component comprises the successive words in the composite signal having the first predetermined value; and the counter repeatedly counts to the predetermined number then recycles in response to the clock signal.

5. The receiver of claim 3 wherein:

the first sync component comprises successive words in the composite signal having one of a first and a second predetermined value, and the second sync component comprises the successive words in the first sync component having the first predetermined value;

the clock signal source produces the clock signal aligned in time to the successive words in the first sync component; and the sync component detector comprises:
- an error detection and correction decoder, responsive to the composite signal, having a data output terminal and a data correct output terminal producing a signal indicating that data at the data output terminal is corrected data;
- a comparator, coupled to the data output terminal of the error detection and correction decoder, having an output terminal producing a signal indicating that the word at the data output terminal of the error detection and correction decoder has the first predetermined sync word value; and
- an AND gate having a first input terminal coupled to the data correct output terminal of the error detection and correction decoder, a second input terminal coupled to the output terminal of the comparator, a third input terminal responsive to the clock signal and an output terminal coupled to the reset input terminal of the counter.

6. A satellite transmission system receiver, for receiving a data signal containing a synchronization (sync) component comprising successive sync words, the receiver comprising:

a sync word predictor, responsive to the received data signal, for predicting the locations of sync words in the received data signal;

a sync word inserter, coupled to the sync word predictor, for substituting a word-having the value of the sync word into the received data signal at a predetermined location; and a sync word detector, for detecting sync words in the data signal and synchronizing the sync word predictor to the received data signal; wherein each of the sync words has a predetermined value; and the sync word detector comprises:
- a source of a clock signal aligned in time with the sync words;
- an error detection and correction decoder, coupled to the sync word inserter, having a data output terminal and a data correct output terminal producing a signal indicating that data at the data output terminal is corrected data;
- a comparator, coupled to the data output terminal for producing a signal indicating that the data at the data output terminal has the predetermined value;
- an AND gate having a first input terminal coupled to the data correct output terminal of the error detection and correction decoder; a second input terminal coupled to the output of the comparator, a third input terminal responsive to the clock signal, and an output terminal coupled to the sync word predictor.

7. A satellite transmission system receiver, for receiving a data signal containing a synchronization (sync) component comprising successive sync words, the receiver comprising:

a sync word predictor, responsive to the received data signal, for predicting the locations of sync words in the received data signal;

a sync word inserter, coupled to the Sync word predictor, for substituting a word having the value of the sync word into the received data signal at a predetermined location; and a sync word detector, for detecting sync words in the data signal and synchronizing the sync word predictor to the received data signal; wherein the sync words in the data signal have one of a first and a second predetermined value;

the sync word predictor further predicts the value of sync words in the received data signal; and the sync word inserter substitutes a word having the predicted value into the received data signal at the predicted location; and wherein the sync word detector comprises:
- a source of a clock signal aligned in time with the successive sync words;
- an error detection and correction decoder, coupled to the sync word inserter, having a data output terminal and a data correct output terminal producing a signal indicating that data at the data output terminal is corrected data;
- a comparator, coupled to the data output terminal for producing a signal indicating that the data at the data output terminal has the first predetermined value;
- an AND gate having a first input terminal coupled to the data correct output terminal of the error detection and correction decoder; a second input terminal coupled to the output of the comparator, a third input terminal responsive to the clock signal, and an output terminal coupled to the sync word predictor.

8. The receiver of claim 7 wherein:

the sync word predictor includes a logic circuit having a first input terminal coupled to the output terminal of the AND gate, a second input terminal responsive to the clock signal and an output terminal generating a control signal having a first value when a location of a sync word having the first predetermined value is predicted, a second value when a location of a sync word having the second predetermined value is predicted, and a third value otherwise; and the sync word inserter comprises a multiplexer, having a first data input terminal coupled a source of a signal having the first predetermined value, a second data input terminal coupled to a source of a signal having the second predetermined value, a third data input terminal responsive to the received data signal, and an output terminal coupled to the sync word predictor, the multiplexer being responsive to the control signal for connecting the first data input terminal to the output terminal when the control signal has the first value, the second data input terminal to the output terminal when the control signal has the second value and the third data input terminal to the output terminal when the control signal has the third value.

* * * * *